May 12, 1959  A. T. SHEPHERD ET AL  2,886,718
MEASURING APPARATUS
Filed May 24, 1956  2 Sheets-Sheet 1
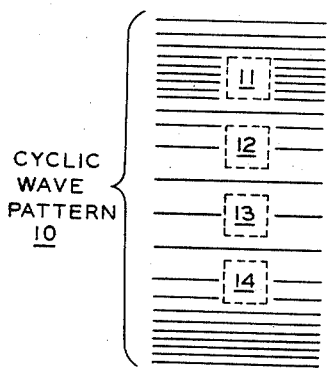
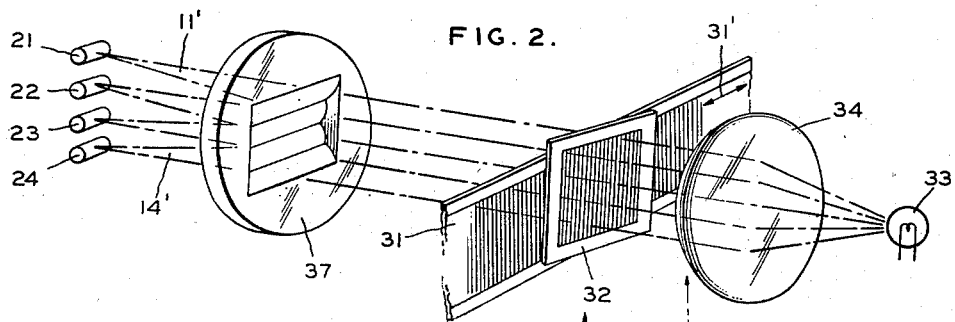
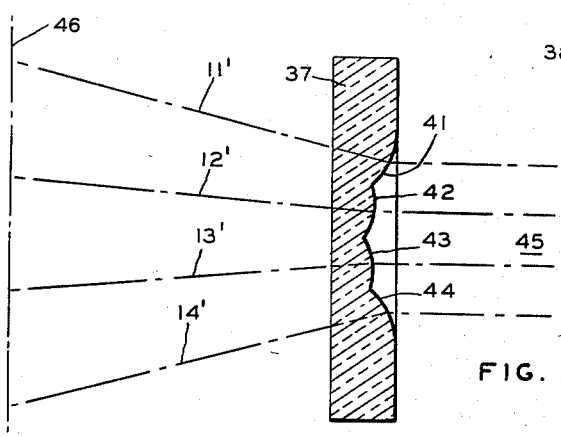
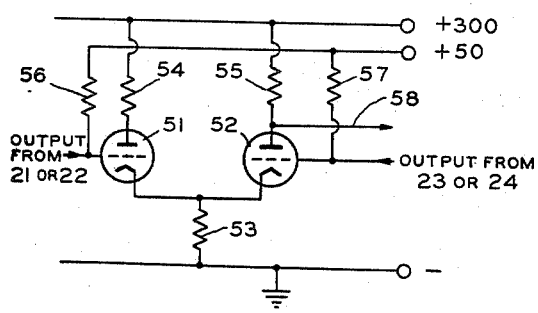
INVENTORS
ALEXANDER TURNBULL SHEPHERD
GEORGE SANDERSON WALKER
BY
Cameron, Kerkam & Sutton
ATTORNEYS

INVENTORS
ALEXANDER TURNBULL SHEPHERD
GEORGE SANDERSON WALKER

BY
Cameron, Kerkam & Sutton
ATTORNEYS

United States Patent Office 2,886,718
Patented May 12, 1959

2,886,718
MEASURING APPARATUS

Alexander Turnbull Shepherd and George Sanderson Walker, both of Edinburgh, Scotland, assignors to Ferranti Limited, Hollinwood, England, a company of Great Britain and Northern Ireland Application May 24, 1956, Serial No. 587,062

Claims priority, application Great Britain May 31, 1955

5 Claims. (Cl. 250—220)

This invention relates to measuring apparatus for determining the extent and sense of the relative movement of a first object, such as a machining tool, in one or other of two opposite directions with respect to a second object, such as the bed of the machine, and is a modification of the invention claimed in co-pending patent application No. 415,942, filed March 12, 1954.

In accordance with that invention, measuring apparatus for determining the extent and sense of the relative movement of a first object in one or other of two opposite directions with respect to a second object comprises means for setting up a cyclic wave pattern adapted to move with respect to said second object in dependence on the said relative movement of said first object, two detecting devices adapted during the said movement of the pattern to respond electrically to the conditions of the pattern at two positions fixed with respect to the second object where said conditions are out of phase with one another by a fraction of half the cyclic wavelength of the pattern, and electrical stages for determining the sense of the said relative movement of said object from the relative phase of the electrical output signals from said detecting devices and for determining the extent of said movement from the number of cycles of said output signals which occur during said movement.

To preserve a response condition appropriate to the relative phase of the conditions of the pattern at the two positions when the pattern is stationary with respect to the detecting devices, thereby allowing the apparatus to resume correct functioning as soon as the pattern begins again to move, it is essential that all the units of the electrical stages should be direct-current coupled and that the detecting devices themselves should have a direct-current response, that is to say, should be such as to produce an output voltage dependent directly on the condition of the pattern rather than dependent on a time derivative of it.

One of the said electrical stages may according to that invention be a discriminating stage arranged to receive the said electrical output signals from said detecting devices, to generate a train of pulses the repetition frequency of which is directly proportional to the frequency of said signals, and to deliver said train of pulses over one or other of two output leads in dependence on the relative phase of said signals. Such a discriminating stage may include means for deriving square-wave signals. It is then essential that the positive and negative half cycles of each wave should be of equal length and amplitude. To derive these signals from the sinusoidal outputs from the detecting devices a combined direct-current (D.C.) amplifier and squaring stage may conveniently be used. In this stage the sinusoidal waves are clipped at predetermined amplitudes on each side of a predetermined D.C. level. Any change in the D.C. component of the input sine waves accordingly results in a distortion of the square waves, rendering the lengths of the positive and negative half-cycles unequal, with a detrimental effect on the accuracy of the apparatus. Such changes of the D.C. level of the input signal may be due to changes in the means for setting up the cyclic wave pattern. For example, where the pattern is an optical pattern and the detecting devices are photocells, any variations of the brightness of the light source which illuminates the pattern or variations of the photocell supply voltages or of the sensitivity and dark-current level of the cells (through age, fatigue, or temperature changes) will shift the D.C. level, and difficulty has been experienced in sufficiently stabilising these and similar factors.

An object of the present invention is accordingly to provide apparatus for the purpose stated in which accurate stabilisation of such factors as are referred to in the preceding paragraph is rendered unnecessary.

In accordance with the present invention, measuring apparatus for determining the extent and sense of the relative movement of a first object in one or other of two opposite directions with respect to a second object includes means for setting up a cyclic wave pattern adapted to move with respect to said second object in dependence on the said relative movement of said first object, first, second, third, and fourth detecting devices adapted during the said movement of the pattern to respond electrically to the conditions of the pattern at first, second, third, and fourth positions respectively, these four positions being fixed with respect to the second object where the conditions at the first and third positions are in approximate counterphase with one another and the conditions at the second and fourth positions are in approximate counterphase with one another, first and second difference stages for deriving electrical signals in sense and quantitative dependence on the vector difference between the signals from the first and third detecting devices and on the vector difference between the signals from the second and fourth detecting devices respectively, said positions being such that said vector differences are out of phase with one another by a fraction of half the cyclic wavelength of the pattern, and further stages for determining the sense of the said relative movement of said first object from the relative phase of the electrical output signals from said difference stages and for determining the extent of said movement from the number of cycles of said output signals which occur during said movement.

Said difference stages may each comprise a direct-current amplifier and means for applying as input to it the signals from the first and third detecting devices, or from the second and fourth detecting devices, as the case may be, the amplifier being adapted to derive an output signal which at any given moment is proportional to the vector difference between the values of the two input signals at that moment.

The conditions of the pattern at the first and second positions may be in quadrature with one another, the conditions of the pattern at the first and third positions being in counterphase with one another, and the condition of the pattern at the second and fourth position being in counterphase with one another.

Where said pattern is an optical pattern, there may be provided four converging lenses mounted to receive light from the pattern at said four positions respectively, said detecting devices including photo-electric devices disposed at the respective focal points of said lenses.

The invention will now be described by way of example as a modification of the embodiment first described in the above-mentioned co-pending application.

In the accompanying drawings,

Figure 1 is a schematic diagram to illustrate the principle of the invention,

Figure 2 shows in perspective a simplified view of one embodiment of the invention, Figure 3 shows to an enlarged scale a part of the embodiment of Figure 2, Figures 4 and 5 are schematic diagrams of connections of suitable forms of apparatus shown generally in Figure 1.

Figure 5:
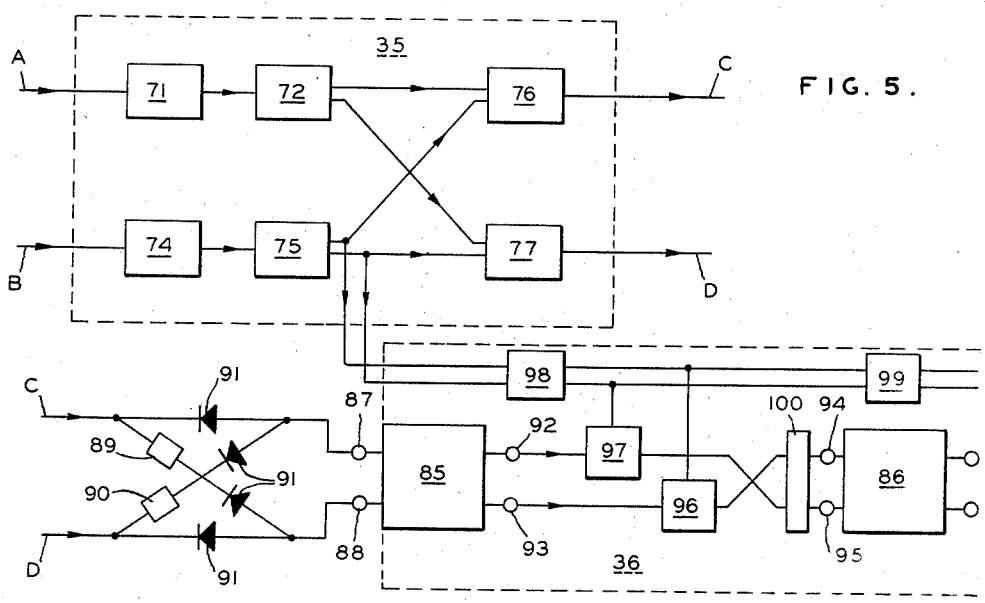

In Fig. 1 the cyclic wave pattern is represented at 10 and the first to the fourth fixed positions at 11 to 14 respectively, with the associated detecting devices at 21 to 24. The pattern conditions at positions 11 and 12 are in quadrature; the conditions at 11 and 13 are in counterphase; and the conditions at 12 and 14 are in counterphase.

The signals from devices 21 and 23 are applied as input to a difference D.C. amplifier 15 the output of which at any given moment is proportional to the difference between the D.C. levels of those signals at that moment. The signals from devices 22 and 24 are applied to another difference amplifier 16 of similar characteristics. The outputs from amplifiers 15 and 16 are applied over leads 17 and 18 to further stages 35 and 36, which may be similar to stages 35 and 36 of the embodiment of the co-pending application above referred to.

It will be appreciated from the above description that in operation the response of each amplifier is independent of any changes in the D.C. level of the outputs from the detecting devices, since such changes affect each detecting device of a pair (21 and 23 or 22 and 24) to an equal extent in the same sense, with the result that the difference between the instantaneous values of the input signals to each amplifier is unaffected by such D.C. level shifts.

The conditions of the pattern at positions 11 and 12 need not be in exact quadrature as long as they are out of phase by some fraction of half a wavelength of the pattern. Similarly the conditions at positions 11 and 13, and 12 and 14, need not be in exact counterphase: in either case any phase difference between approximately three-eighths to five-eighths of the pattern wavelength is in practice found to give good results. These two phase differences should be such that the vector difference of the signals applied to amplifier 15 is out of phase with the vector difference of the signals applied to amplifier 16 by a fraction of half the cyclic wavelength of the pattern, a quadrature relationship being preferable. It follows therefore that where the conditions at positions 11 and 12 are in quadrature the phase difference between the conditions at position 11 and 13 should be the same as the phase difference between the conditions at positions 12 and 14 if the quadrature relationship is to be preserved at the amplifier inputs.

Any of these phase differences may of course be increased by an integral multiple of full wavelengths, though in practice it may be found advisable to keep the positions of each pair close together so that any variations of the pattern as a whole—for example, where the pattern is an optical pattern, variations due to changes in the light source—affect each detecting device of a pair equally.

In the above-described arrangement the cyclic wave pattern may be an optical pattern, an electromagnetic standing-wave pattern, a recorded magnetic pattern, or a cyclic pattern of other sort, the detecting devices being photocells, probes, magnetic pick-offs, etc., as the case may be.

An embodiment of the invention, similar to the embodiment of Fig. 1 of the co-pending application but much simplified for clarity, will now be described by way of example with reference to Fig. 2, the cyclic wave pattern being an optical pattern.

In this arrangement the grating carried by the first object—i.e. the moving object—is indicated at 31 and the fixed grating at 32, the lines of grating 32 being adjustably skew relative to the lines of grating 31 to set up the cyclic wave pattern as described in the co-pending application. The pattern is illuminated by light from a source 33 of small area which is collimated by a spherical lens 34 into a parallel beam which passes through the pattern. On emerging from the pattern the beam passes through a lens assembly 37 of special design which splits the beam into four diverging sections $11^1$ to $14^1$ and brings each of them to a separate focus on a detecting device in the form of a photocell 21, 22, 23, or 24, as the case may be. The outputs from the cells are applied to the difference amplifiers 15 and 16 as described with reference to Fig. 1.

The extent of skew of grating 32 is adjusted until the four sections $11^1$ to $14^1$ of the beam are respectively derived from the four phase-displaced areas 11 to 14 of the pattern. Movement of grating 31 (in either of the directions indicated by the arrow $31^1$) causes the pattern to drift up or down the array of photocells, amplifiers 15 and 16 responding as described.

To render the light falling on each photocell more homogeneous—that is, to derive the light for each photocell from an area of the pattern of less phase extent—a mask, shown separately at 38 in Fig. 2, may be inserted between lens 34 and the pattern. The mask has four parallel slots 39 extending in a direction normal to the lines of grating 31; the centre lines of the slots are spaced apart to the extent of a quarter wavelength of the pattern. The length of the slots 39 is not critical; the maximum length practicable is usually to be desired, since the longer the slots the more light is passed and the less is the sensitivity required from the photocells.

A sectional view of lens assembly 37 is shown in Fig. 3. This consists, in effect, of four converging lenses 41 to 44 combined in a unitary structure. Each lens is designed to receive light (in the parallel beam 45) from the particular part of the pattern concerned—lens 41 from the part of the pattern at position 11, and so on—and bring it to a focus on the appropriate photocell. Conveniently, the lenses are also designed so that the centres of all four cells lie on one straight line, indicated at 46.

Each difference amplifier 15 or 16 may take the form shown in Fig. 4. Triode valves 51 and 52 have their cathodes earthed by a common resistor 53 and their anodes connected by way of resistors 54 and 55 respectively to the positive pole of a source of about 300 volts the negative pole of which is earthed. The outputs from the respective photocells or other detecting devices are applied between earth and the control grids of the respective valves, which grids are connected by way of resistors 56 and 57 respectively to a 50 volt positive tapping on the source. The output is derived from the anode of valve 52 over a lead 58.

In operation, a small change in the difference between the input voltage levels allows the common cathode-load current to remain substantially constant, and the resulting change of the grid/cathode voltage of valve 52 appears amplified at output lead 58. On the other hand, an equal change in the same direction of the voltages at the control grids—due, say, to a change in the brightness of illumination of the pattern—changes the common cathode-load current in such a sense as to change the cathode potential in the direction of the corresponding change of the potentials of the grids, with the result that the grid/cathode voltage of valve 52 alters by only a very small amount, producing only second-order changes of the voltage on output lead 58, which have no appreciable effect on the subsequent stages. Hence, as already stated, the amplifier output at any given moment is proportional only to the difference between the values of the two input signals from the photocells at that moment.

Figure 6:
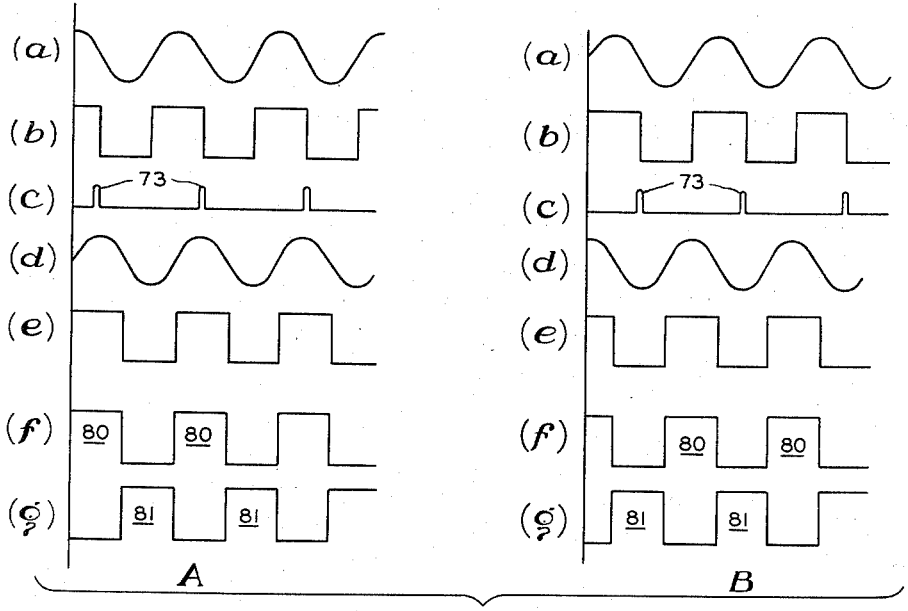
Figure 6 shows electrical waveforms to illustrate the operation of the equipment of Figure 5.

As already stated, discriminator and counter stages 35 and 36 may be of the kind disclosed in the co-pending application. One embodiment of these stages, however, will now be described by way of example, with reference to the diagram of Fig. 5 and the waveforms of Fig. 6A (current A leading) and Fig. 6B (current B leading).

The discriminator includes an A channel and a B channel fed by signals received over leads A and B from leads 17 and 18 respectively. The A channel includes a combined D.C. amplifier and squaring stage 71 designed to produce from the A current (Fig. 6 waveform (a)) a signal of square waveform (b) in synchronism with it. This stage is followed by a pulse-forming stage 72 for deriving from the output of stage 71 a sharp pulse 73 (waveform (c)) in coincidence with each negative-going edge of waveform (b); a differentiator followed by a rectifier are suitable components for this stage. One pulse is therefore produced in respect of each cycle of the A current. These pulses will be referred to for convenience as the A pulses.

The B channel includes another D.C. amplifier and squaring stage 74 similar to stage 71 to produce from the B current (waveforms (d)) a signal of square waveform (e) in synchronism with it. This signal is applied to a push-pull stage 75 designed to produce a first square-wave output signal (f) in phase with signal (e) and a second square-wave output signal (g) in counterphase.

In the A channel is a gating stage 76 and in the B channel another gating stage 77. These will be referred to for convenience as the A gate and the B gate. Each gate is of the kind designed to produce an output signal only when each of two input signals is positive. The A pulses from stage 72 are applied in a positive-going sense as one of the inputs to each gate. First output signal (f) from push-pull stage 75 is applied as the other input to the A gate, whilst the second output signal (g) is applied as the other input to the B gate. Each of the gates may conveniently comprise a pentode valve to the control grid and suppressor grid of which are applied the A pulses and the square-wave signals respectively. The valve is biased on both grids to anode current cut-off and is designed to conduct when both the signals on these grids are positive. The outputs from the gates A and B are applied to counter 36 over leads C and D respectively.

It will be apparent from the above description that:

(a) There is one A pulse per cycle of each of the first and second output signals (f) and (g);

(b) Owing to the quadrature displacement of currents A and B each A pulse 73 occurs in approximate synchronism with the mid point of a square-wave half cycle of those signals; each pulse 73 therefore occurs wholly within a half-cycle period of signals (f) and (g), that is to say, the pulse does not occur partly in one half-cycle and partly in the next;

(c) One of the half-cycles with which each A pulse 73 coincides is positive and the other negative, since these signals are in counterphase;

(d) Each gate 76 and 77 passes the A pulse when the coinciding half-cycle is of positive sense, this sense being predetermined and the same for each gate, and (e) The criterion which determines whether these positive half-cycles are those of the first or the second output signals (f) or (g) is the phase relationship between the quadrature A and B currents, i.e. which is the leading current.

It is assumed that the arrangement is such that when the A current is leading (Fig. 6A), the positive half-cycles coinciding with the A pulses are those half-cycles 80 of the first output signal (f); and that when the B current is leading (Fig. 6B), the positive half-cycles coinciding with the A pulses are those half-cycles 81 of the second output signal (g).

When, therefore, the A current is leading, each A pulse arrives at the A gate at a time when the other input signal to the gate is also of positive sense; the result is that this gate passes each A pulse over the above-mentioned lead C. On the other hand each A pulse arrives at the B gate when the other input signal to this gate is negative, for the reason indicated in sub-paragraph (c) above. This gate accordingly remains closed and no pulses are passed over lead D. The pulses to the counter are therefore applied over lead C only.

Similarly when the B current is leading, the A gate is maintained closed and the counter receives pulses over lead D only.

The counter 36 may consist of a sufficient number of scale-of-ten counting tubes connected in cascade and arranged for algebraic summation. The units and tens tubes are shown generally at 85 and 86 respectively. These tubes may be of the Dekatron type; in which case arrangements are made to apply the pulses on lead C to guide-ring No. 1 (shown at 87) of the "units" tube 85 with no time-lag and to guide-ring No. 2 (shown at 88) with a time-lag supplied by a delay stage 89, and to apply the pulses on lead D to the guide-rings 87 and 88 with a time-lag supplied by a delay stage 90, and without a time-lag respectively. Metal rectifiers 91 are introduced into each of these four connections to the guide-rings to prevent interaction.

The 9th and 10th electrodes 92 and 93 of tube 85 are coupled to the appropriate guide-rings 95 and 94 of tube 86 by way of gates 97 and 96 and a time-lag network 100.

Gates 97 and 96 are controlled respectively by the second and first output signals (f) and (g) from push-pull stage 75 so that pulses from the 10th electrode 93 are passed when addition is required and pulses from the 9th electrode 92 when subtraction is required. As the tube 85 operates with an appreciable time-lag it is necessary to apply these control signals to the gates 96 and 97 through some sort of delay device or network indicated at 98 and to impose an additional delay on these signals by means of a further delay device 99 before applying them to the pair of gates (not shown) between the "tens" tube 86 and the "hundreds" tube (not shown) if supplied. An additional delay must similarly be imposed at each subsequent stage.

Network 100 consists of components similar to components 89, 90, and 91 and connected in the same manner, so that the pulses from electrode 92 are applied to guide-ring 95 with no time-lag but to guide-ring 94 with a time-lag whereas the pulses from electrode 93 are applied to guide-rings 95 and 94 with and without a time-lag respectively. A similar network is used for the "hundreds" and each higher tube.

The operation of the counter need not be described in detail since each tube operates in a known manner, adding or subtracting each pulse in dependence on which of the two guide-rings the pulse reaches first, that is, in dependence on which ring the pulse reaches without the time-lag imposed by stage 89 or 90, or the equivalent stage associated with the "tens" and later tubes.

It should be understood that, as already explained, the invention is not limited to applications where the cyclic wave pattern is an optical pattern.

What we claim is:

1. Measuring apparatus for determining the extent and sense of the relative movement of a first object in one or other of two opposite directions with respect to a second object including means for setting up a cyclic wave pattern adapted to move with respect to said second object in dependence on the said relative movement of said first object and wherein the conditions of the pattern at four positions fixed with respect to said second object are so related that the conditions at the first and third positions are in approximate counterphase with one another and the conditions at the second and fourth positions are in approximate counterphase with one another but out of phase with the conditions at said first and third positions by a fraction of half the cyclic wavelength of the pattern, first, second, third and fourth detecting devices fixed with respect to said second object and operative to produce electrical signals responsive to and indicative of the conditions of the pattern at said first, second, third and fourth positions respectively, first and second difference stages connected to said first and third detecting devices and to said second and fourth detecting devices respectively for deriving electrical signals in sense and quantitative dependence on the vector difference between the signals from the first and third detecting devices and on the vector difference between the signals from the second and fourth detecting devices respectively, said positions also being so related that these vector differences are out of phase with one another by a fraction of half the cyclic wavelength of the pattern, and further stages connected to said difference stages for determining the sense of the said relative movement of said first object from the relative phase of the electrical output signals from said difference stages and for determining the extent of said movement from the number of cycles of said output signals which occur during said movement.

2. Apparatus as claimed in claim 1 wherein said first difference stage comprises a first direct-current amplifier and means for applying as input to it the signals from said first and third detecting devices, and said second difference stage comprises a second direct-current amplifier and means for applying as input to it the signals from said second and fourth detecting devices, each of said first and second amplifiers being operative to derive an output signal which at any given moment is proportional to the vector difference between the values of the two input signals to said amplifier at that moment and to apply said output signals to said further stages.

3. Measuring apparatus for determining the extent and sense of the relative movement of a first object in one or other of two opposite directions with respect to a second object including two superimposed optical gratings, one secured to said first object and the other to said second object, said gratings being ruled to produce together a cyclic coincidence pattern of alternate opacities and transparencies adapted to move with respect to said second object in dependence on the said relative movement of said first object and wherein the conditions of the pattern at four positions fixed with respect to said second object are so related that the conditions at the first and third positions are in approximate counterphase with one another and the conditions at the second and fourth positions are in approximate counterphase with one another but out of phase with the conditions at said first and third positions by a fraction of half the cyclic wavelength of the pattern, means for illuminating said pattern, first, second, third and fourth detecting devices fixed with respect to said second object and so arranged relative to said gratings as to be illuminated by the light from said first, second, third and fourth positions of the pattern respectively and to produce electrical signals indicative of the conditions of the pattern at said positions, first and second differences stages connected to said first and third detecting devices and to said second and fourth detecting devices respectively for deriving electrical signals in sense and quantitative dependence on the vector difference between the signals from the first and third detecting devices and on the vector difference between the signals from the second and fourth detecting devices respectively, and further stages connected to said difference stages for determining the sense of the said relative movement of said first object from the relative phase of the electrical output signals from said difference stages and for determining the extent of said movement from the number of cycles of said output signals which occur during said movement.

4. Apparatus as claimed in claim 3 including four converging lenses mounted to receive light from said four positions of the pattern respectively, and wherein said detecting devices include photo-electric devices disposed at the respective focal points of said lenses.

5. Apparatus as claimed in claim 3 wherein each of said difference stages comprises a direct-current amplifier including a pair of triode valves having their cathodes earthed by a common resistor and their anodes connected to the positive pole of a common voltage source the negative pole of which is earthed, means for applying the signals from the first and third detecting devices to the control grids of the valves of the amplifier of said first difference stage, and means for applying the signals from the second and fourth detecting devices to the control grids of the valves of the amplifier of said second difference stage, the amplifier of each of said difference stages being operative to produce an output signal at the anode of one of the valves of said amplifier which at any given moment is proportional to the vector difference between the values of the two signals applied to the control grids of said valves at that moment and to apply said output signal to said further stages.

References Cited in the file of this patent

UNITED STATES PATENTS

| | | |
|---|---|---|
| 2,142,378 | Sachtleben | Jan. 3, 1939 |
| 2,179,000 | Tea | Nov. 7, 1939 |
| 2,416,968 | Turrettini | Mar. 4, 1947 |
| 2,503,023 | Berry | Apr. 4, 1950 |
| 2,857,802 | Cail | Oct. 28, 1958 |